United States Patent Office 3,035,013
Patented May 15, 1962

3,035,013
COATING COMPOSITION COMPRISING OXIDIZED DIENE POLYMER, OXIDIZED POLYMER OF A PETROLEUM DISTILLATE AND TITANATE ESTER, AND PROCESS OF MAKING SAME
Neville Leverne Cull, Baker, and Richard Louia Ray, Baton Rouge, La., assignors to Esso Research and Engineering Company, a corporation of Delaware
No Drawing. Filed Aug. 17, 1959, Ser. No. 833,936
14 Claims. (Cl. 260—45.5)

This invention relates to hard, chemical resistant, protective films and more specifically relates to films produced when oxidized liquid polymers of diolefins are cured with the aid of titanium alcoholates.

It is known to prepare drying oils by polymerizing conjugated diolefins such as butadiene-1,3, isoprene, piperylene, etc., or by copolymerizing such diolefins with vinyl aromatic hydrocarbons, such as styrene or alkyl aromatic hydrocarbons such as toluene, ethyl benzene, etc. These processes may be carried out in the presence of alkali metals, e.g., sodium, as the catalyst. Peroxide catalysts, such as benzoyl peroxide, or complexes of boron fluoride with oxygenated compounds, e.g., the $BF_3$-ethyl etherate-water complex described in the Miller patent, U.S. Patent No. 2,708,639, can also be used. Thus oils are prepared which, when dissolved in an equal quantity of hydrocarbon solvent such as mineral spirits, generally have a viscosity at 25° C. between about 0.1 and 20 poises, or about 400 to 20,000 poises when diluent-free.

The oils thus obtained are particularly useful as protective coatings in the form of colorless varnishes or enamels and may be either air dried or baked. However, they have been somewhat deficient in drying properties, requiring prolonged drying exposures where conventional film thickness is used or giving soft films where heavier film thicknesses are required. This problem has been overcome by blowing the oils with air or oxygen while maintaining them in the form of a homogeneous solution in one or more solvents, particularly those having a Kauri-Butanol value of at least 40, i.e., those having a substantially high aromatic content, preferably in the presence of catalysts such as metallic driers (e.g., those composed of or containing lead, iron, cobalt, manganese, zinc, etc., in the form of naphthenates, octoates, oleates, etc.), peroxides or dispersed alkaline salts.

While the above oxidation process greatly improves the oils for use as coating compositions, they still fall far short of the stringent requirements necessary for the protection of the interior of food packaging containers. They do not always properly wet the surface of tin plate or can makers' quality steel. Severe eyeholing occurs, especially with the non-oxidized oils. Although the oxidized oils are more favorable with respect to wetting the surface of the steel and eyeholing is thus reduced, still these oxidized oils fail to withstand the chemical attack of many foods during processing. It is known that the difficulties attendant the use of the non-oxidized oils can be overcome by the addition of small quantities of a substantially non-volatile, organic solvent-soluble titanium alcoholate and the like as described in the U.S. Patent 2,875,919 to Henderson. Unfortunately, however, when the teachings of this patent are applied to the oxidized or air-blown oils, it is found that the oxidized oil gels, at least partially, immediately upon the addition of the titanium alcoholate.

In accordance with the present invention, these and other disadvantages of the use of oxidized or air blown diolefin polymers or co-polymers containing titanium alcoholates as can coating compositions can be overcome by adding the titanium alcoholate to an oxidized (air blown) resin obtained by polymerizing with $AlCl_3$ a steam-cracked petroleum fraction boiling 18° to 85° C. ($C_5$ to $C_7$) or of any narrower fraction thereof and then adding the oxidized diolefin polymer to this mixture. This order of addition is important. If the titanium alcoholate is added to the oxidized diolefin, polymer gelation occurs immediately. However, almost no gelation occurs when the titanium alcoholate is added to the oxidized petroleum resin followed by addition of the oxidized diolefin polymer. Very little, if any, gelation occurs on standing. If any does occur, it can be easily removed by filtering. It is important that the resin be oxidized because gelation is not prevented by the use of the nonoxidized resin from the steam-cracked fraction. The resulting blend of the two oxidized polymers and the titanium alcoholate can be cured by baking films thereof at elevated temperatures. Coatings are formed which are hard and strongly resistant to chemical attack.

The hydrocarbon drying oils which are suitable for oxidizing in accordance with this invention are oily polymers of butadiene, isoprene, dimethyl butadiene, piperylene, methyl pentadiene or other conjugated diolefins having four to six carbon atoms per molecule. Instead of polymerizing any of the aforesaid diolefins alone, they may be copolymerized in admixtures with each other or in admixtures with minor amounts of ethylenically unsaturated monomers copolymerizable therewith, e.g., with 0 to 40% of styrene, styrenes having alkyl groups substituted on the ring such as paramethylstyrene, dimethyl styrene or diethyl styrene, acrylonitrile, methacrylonitrile, methyl acrylate, methyl methacrylate and the like. Such synthetic oils may be advantageously prepared by mass polymerization either in the presence of a hydrocarbon soluble peroxide catalyst such as benzoyl peroxide or cumene hydroperoxide, or in the presence of metallic sodium when the monomers consist of a diolefin or of a mixture of a diolefin with a styrene compound. Under proper conditions the emulsion polymerization technique may also be adapted to the preparation of drying oils to which the present invention is applicable. Suitable polymerization methods are illustrated below. Throughout the present description, it will be understood that all proportions are expressed on a weight basic unless otherwise specified.

SYNTHESIS METHOD A

For example, 100 parts of butadiene-1,3, 50 parts of straight run mineral spirits boiling between 150° and 200° C. (Varsol), 3 parts of t-butyl hydroperoxide (60% pure) and 0.75 part of diisopropyl xanthogen disulfide are heated in a closed reactor at about 90° C. for 40 hours, whereupon the residual pressure is released and unreacted butadiene is allowed to volatilize from the polymerized mixture at 70° C. The resulting product, which is clear, water-white solution, consists typically of about 60 parts of oily polymer of butadiene, about 4 parts of butadiene dimer, plus solvent and some t-butyl alcohol. This solution of polymer is then preferably fractionated to remove the dimer and usually adjusted to 50% non-volatile matter content. The non-volatile constituent, which is the oily polymer of butadiene, has a molecular weight between 1,000 and 10,000, preferably between 2,000 and 5,000. It will be understood, of course, that the foregoing procedure is only illustrative and that it can be modified in many ways, particularly as described in U.S. Patent No. 2,586,594 of Arundale et al. which describes alternative monomers, catalysts, reaction diluents, polymerization modifiers, suitable ranges of proportions of the various ingredients, suitable ranges of polymerization conditions, etc., the teachings of which are incorporated herein.

SYNTHESIS METHOD B

An alternative polymerization method using sodium as catalyst is illustratd as follows: 80 parts of butadiene-1,3, 20 parts of styrene, 200 parts of straight run mineral spirits boiling between 150° and 200° C., 40 parts of dioxane, 0.2 part of isopropanol, and 1.5 parts of finely dispersed sodium are heated at about 50° C. in a closed reactor provided with an agitator. Complete conversion is obtained in about 4.5 hours whereupon the catalyst is destroyed by adding an excess of glacial acetic acid, sulfuric acid or other anhydrous oragnic acid, or by filtering through clay or the like. The colorless product is then fractionally distilled to remove hydrocarbon diluent and modifiers such as dioxane until a product containing about 50%–100% nonvolatile matter is obtained.

Again it will be understood that the described sodium polymerization method may be varied considerably as by omitting the styrene co-reactant; or by adding the styrene only after the polymerization of the butadiene monomer has begun; or dioxane may be replaced by 10 to 35 parts of another ether modifier having 3 to 8 carbon atoms such as diethyl ether, methylethyl ether, dibutyl ether, or phenetol; or the modifier may be omitted altogether, especially when it is not essential to obtain a perfectly colorless product. Similarly, isopropanol is not necessary, though aliphatic alcohols of 1–6 carbon atoms generally have the beneficial effect of promoting the reaction when present in amounts ranging from 2 to 50% based on the weight of sodium catalyst. Furthermore, the mineral spirits may be replaced by other inert hydorcarbon diluents boiling between about −150° C. and 250° C., preferably between 60° and 200° C., e.g., butane, benzene, xylene, naphtha, cyclohexane, and the like, e.g., Solvesso 100 (an aromatic fraction boiling between 157° and 177° C., and having a Kauri-Butanol value of 98–100). The diluents are usually used in amounts ranging from 50 to 500 parts per 100 parts of monomer. The reaction temperature may vary between about 40° C. and 105° C., preferably around 50° to 85° C. As a catalyst, 0.1 to 10 parts of dispersed metallic sodium is used per 100 parts of monomers, sodium particle sizes below 100 microns being particularly effective.

A particularly suitable process for the preparation of the polymer oil in accordance with this synthesis is that described in U.S. Patent 2,762,851 issued September 11, 1956, to Anthony H. Gleason, or the multistage continuous process described and claimed in U.S. Patent No. 2,849,510 in the name of Stanley E. Jaros et al. The disclosures of these applications are incorporated herein by reference.

In addition to the above-described methods of synthesis, oils suitable for use in this invention can also be prepared by use of a $BF_3$-etherate-water catalyst according to the teachings of the Miller Patent 2,708,639.

The polymer oils prepared in accordance with any of the above methods of synthesis are oxidized by blowing with air or oxygen in the presence of a cobalt, lead, iron, or manganese catalyst at a temperature between 20° and 150° C. for about 1 to 2 hours in the presence or absence, depending upon viscosity, of an aromatic hydrocarbon solvent. A suitable method for oxidizing these oils is described in application Serial No. 665,571 filed June 13, 1957, in the names of William B. Seagraves and George O. Hillard, Jr., now U.S. Patent No. 2,895,979, the disclosure of which is incorporated herein by reference. Polymer oils so treated generally contain from about 5 up to about 20% of combined oxygen.

The resins to be oxidized and blended with the above oxidized oils are prepared from steam-cracked petroleum fractions. Such fractions are obtained by cracking heavy naphtha, kerosene, gas oil and the like at temperatures of 1000° to 1600° F. in the presence of steam and for relatively short contact times. The resulting cracked product is fractionated to remove all material heavier than benzene (85° C.+). The resulting fraction has a boiling range of 18° to 85° C. and contains approximately 40 to 50% $C_5$, 30 to 55% $C_6$, and less than 5% $C_7$ olefins and diolefins. This broad fraction may be further treated to select narrower fractions. For example, it may be fractionated into a $C_5$ and a $C_6$ fraciton and either one used as feed to the resin polymerization. The $C_5$ fraction contains about 30% isoprene and piperylene and 65% olefins. This fraction may be extracted to remove the isoprene in which case a fraction boiling 38° to 46° C. is obtained. Such a fraction has the following typical analysis:

| | Wt. percent |
|---|---|
| Isoprene | 0.5 to 3.0 |
| Trans-pentene-2 | 3.0 to 5.0 |
| Cis-pentene-2 | 2.0 to 12.0 |
| 2-methyl butene-2 | 2.0 to 20.0 |
| Cyclopentadiene | 0 to 5.0 |
| Transpiperylene | 20 to 55.0 |
| Cis-piperylene | 15 to 55.0 |
| Cyclopentene | 7 to 20.0 |
| Cyclopentane | 0 to 4 |
| Acetylenes | Traces |
| $C_6+$ | 0 to 2 |

These fractions may be modified by the addition of diolefin monomers, dimers, codimers, or heavy tetramers such as $C_4$, $C_5$, and $C_6$ cyclic or acyclic diolefins, e.g., cyclopentadiene dimers, etc., e.g., the 38°–46° C. fraction may be blended with 36%–40% of dicyclopentadiene.

The polymerization of the selected feed is carried out by means of a Friedel-Crafts catalyst such as aluminum chloride, aluminum bromide, boron fluoride, zirconium tetrachloride, or the complexes of any of these at a temperature of −15° to +66° C. The use of about 0.5 to 2% catalyst is usually sufficient. The process is carried out as a liquid phase operation, either continuously or batchwise. The products are worked up by water or caustic washing or by washing with dilute sulfuric acid (5%) followed by water washing. The resin is stripped free of unreacted feed components and any low molecular weight polymers to give the final resin. The exact yield and softening point of the final product will depend on the degree of stripping. This process is described in detail in U.S. Patent 2,775,575 of Hamner, the disclosure of which is incorporated herein by reference.

The resin thus obtained is oxidized by blowing with air or oxygen as described above in connection with the oxidation of the diolefin polymeric drying oils. About 10% oxygen can be added to the resin in this manner. If desired the resin may be mixed with the polymer prior to the blowing and the mixture blown as described.

The titanium compounds found useful in connection with this invention are the titanium alcoholates of the general formula $Ti(OR)_4$ where R is an alkyl radical of from 4 to 20 carbon atoms. These compounds are formed from their corresponding aliphatic monohydric alcohols. Tetraisopropyl orthotitanate is particularly suitable. The tetra (2-ethyl hexyl) ortho-titanate may also be used. Ordinarily at least 0.5% of the titanium alcoholate based on the oxidized hydrocarbon blend is required to obtain a practical improvement in the properties of the coating derived from the oxidized polymers. A concentration of about 1.5 to 5% is preferred, but amounts up to 15% may be used. The two oxidized polymers are mixed in proportions of 10 to 35 wt. percent of the oxidized resin to 65 to 90% of the oxidized diolefin polymer.

While the coating compositions of this invention are particularly suited for use as can coatings, they may also be used for impregnating fibers, paper, cardboard, and the like. Fiberboard impregnated with the composition of this invention and baked at elevated temperatures yields superior products having a high degree of structural strength.

The following specific examples represent the best modes contemplated for practicing the invention. The parts and percentages are expressed on a weight basis unless otherwise stated.

Example 1

A butadiene-styrene drying oil was prepared from the following charge:

| | Parts |
|---|---|
| Butadiene-1,3 | 80 |
| Styrene | 20 |
| Varsol [1] | 200 |
| Dioxane | 40 |
| Isopropanol | 0.2 |
| Sodium (10–50 microns) | 1.5 |

[1] Straight-run mineral spirits boiling between 150° and 700° C. having a Kauri-Butanol value of 33–37.

This charge was polymerized at 50° C. in a 2-liter autoclave provided with a mechanical agitator. Complete conversion was obtained in 4.5 hours. The catalyst was destroyed and removed, and the resulting product was stripped of solvent and redissolved in Solvesso 100 (an aromatic fraction boiling between 157° and 177° C. and having a Kauri-Butanol value of 98–100) and blown with air to an oxygen content of about 10%.

Example 2

A cracked naphtha fraction boiling between 38° and 46° C. and having the following analysis:

| | | |
|---|---|---|
| Isoprene | wt. percent | 1.1 |
| Trans-pentene-2 | do | 3.6 |
| Cis-pentene-2 | do | 7.4 |
| 2-methyl butene-2 | do | 13.7 |
| Cyclopentadiene | do | 1.2 |
| Trans-piperylene | do | 34.2 |
| Cis-piperylene | do | 20.9 |
| Cyclopentene | do | 14.7 |
| Cyclopentane | do | 1.5 |
| Acetylenes | do | Trace |
| $C_6+$ | do | 1.0 |
| Refractive index | | 1.4183 |
| Specific gravity | | 0.6926 | was blended with 38% dicyclopentadiene and polymerized with 1.2 wt. percent $AlCl_3$ (based on feed) at 80°–100° F. for 1.5 hours to yield a resin which after stripping had a softening point of about 85° C. The resin was redissolved in Solvesso 100 and blown with air until about 10% oxygen had been added.

Example 3

Eighteen grams of a hydrocarbon solution of the oxidized oil of Example 1 having a non-volatile content of 50% were mixed with 3.3 grams of Solvesso 100 containing 0.5 gram of titanium isopropylate. An orange-colored gel immediately precipitated out. When this experiment was repeated using only 0.1 to .15 gram of titanium isopropylate, slight gelling occurred.

Example 4

Eighteen grams of the oxidized oil used in Example 3 were added to 3.3 grams of the oxidized resin of Example 2 having a non-volatile content of 30% and which contained 0.5 gram of titanium isopropylate. The resulting blend was free from gel, and when a film was put on tin plate and baked 72 hours at 130° C., the result was a hard, tough, flexible coating that showed excellent adhesion to the tin plate.

Example 5

Fifteen grams of the oxidized oil used in Examples 3 and 4 were added to 8.3 grams of the oxidized resin used in Example 4 containing 0.5 gram of titanium isopropylate. No gelation was observed.

Example 6

Twenty grams of an oxidized polymer oil similar to that of Example 1, but containing 16% oxygen and having a non-volatile content of 45%, were added to 3.3 grams of Solvesso 100 containing 0.1 gram of titanium isopropylate. Slight gelation was observed immediately, which became severe after standing 2 hrs. The mixture set up to a solid after 16 hours.

Example 7

Twenty grams of the oxidized polymer of Example 6 were added to 3.3 grams of the oxidized resin of Example 4 containing 0.1 gram of titanium isopropylate. Very slight gelation was noted after 16 hours.

Example 8

Fifteen grams of the oxidized oil of Example 1 were added to 8.3 grams of the non-oxidized resin of Example 2 having a non-volatile content of 30% and containing 0.5 gram of titanium isopropylate. Moderate gelation was observed.

Example 9

Twenty-five grams of a solution of oxidized polybutadiene (no styrene) having a non-volatile content of 30%, and prepared according to the recipe of Example 1, and oxidized to an oxygen content of 16%, were mixed with 8.3 grams of the oxidized resin of Example 2 having a non-volatile content of 30% and containing 0.2 gram of titanium isopropylate. No gelation was noted. A similar experiment in which no oxidized resin was used in the blend gelled immediately upon the addition of the titanium isopropylate.

The above data show that this invention provides desirable improvement in the liquid coating compositions, comprising oxidized diolefin polymers. The improvement resides in providing the liquid composition with resistance to gelation. Liquid solutions of oxidized butadiene-1,3 polymers and copolymers are susceptible to gelation to varying degrees when modified with titanium alcoholates. The presence of the stabilizing oxidized steam-cracked resin successfully inhibits this gelation. The compositions of the invention can be stored and transported to the consumer with assurance that no gel will have precipitated out by the time it reaches its destination.

The nature and objects of the present invention having been thus fully set forth and specific examples of the same given, what is claimed as new and useful and desired to be secured by Letters Patent is:

1. A coating composition characterized by resistance to gelation consisting essentially of (A) 65–90 parts of an oxidized drying oil, said oxidized drying oil being prepared by polymerizing a $C_4$ to $C_6$ conjugated diolefin to prepare a drying oil and blowing the resulting drying oil with a gas selected from the group consisting of air and oxygen at a temperature between 20 and 150° C. until the oil contains 5 to 20% oxygen in its structure; (B) 10–35 parts of an oxidized resin obtained by polymerizing a steam-cracked petroleum distillate stream boiling between 18 and 85° C. with a Friedel-Crafts catalyst at a temperaturt between —18 and +66° C. and blowing the resulting resin with a gas selected from the group consisting of air and oxygen in the presence of a catalyst chosen from the group consisting of cobalt, lead, iron and manganese at a temperature between 20 and 150° C. for one to two hours and (C) 0.5 to 15 wt. percent of a non-volatile titanate ester of monohydric aliphatic alcohols, based on the blown diolefin polymer drying oil.

2. The composition according to claim 1 in which the air blown polymer oil is air blown polybutadiene.

3. The composition according to claim 1 in which the air blown polymer oil is the air blown liquid copolymer of butadiene and styrene.

4. The composition according to claim 1 in which the oxidized resin is obtained by polymerizing a feed stock consisting of 60 to 64% of a steam-cracked petroleum fraction boiling between 38° and 46° C. and having the following composition:

| | Wt. Percent |
|---|---|
| Isoprene | 0.5 to 3.0 |
| Trans-pentene-2 | 3.0 to 5.0 |
| Cis-pentene-2 | 2.0 to 12.0 |
| 2-methyl butene-2 | 2.0 to 20.0 |
| Cyclopentadiene | 0 to 5.0 |
| Trans-piperylene | 20 to 55.0 |
| Cis-piperylene | 15 to 55.0 |
| Cyclopentene | 7 to 20.0 |
| Cyclopentane | 0 to 4.0 |
| Acetylenes | Trace |
| $C_6+$ | 0 to 2 | and 36 to 40% dicyclopentadiene, and air blowing the resulting resin.

5. The composition according to claim 1 in which the ester is titanium tetra-isopropylate.

6. The composition according to claim 4 in which the air blown polymer oil is air blown polybutadiene, and the ester is titanium tetra-isopropylate.

7. The composition according to claim 4 in which the air blown polymer oil is an air blown liquid copolymer of butadiene and styrene, and the ester is titanium tetra-isopropylate.

8. A process for preparing a coating composition comprising mixing (A) 65 to 90 parts by weight of an oxidized drying oil, said oxidized drying oil being prepared by polymerizing a $C_4$ to $C_6$ conjugated diolefin to prepare a drying oil and blowing the resulting drying oil with a gas selected from the group consisting of air and oxygen at a temperature between 20 and 150° C. until the oil contains 5 to 20% oxygen in its structure; with (B) 0.5 to 15 parts of an oxidized resin obtained by polymerizing a steam-cracked petroleum distillate stream boiling between 18 and 85° C. with a Friedel-Crafts catalyst at a temperature between −18 and +66° C. and blowing the resulting resin with a gas selected from the group consisting of air and oxygen in the presence of a catalyst chosen from the group consisting of cobalt, lead, iron and manganese at a temperature between 20 and 150° C. for one to two hours and (C) 0.5 to 15 wt. percent of a non-volatile titanate ester of monohydric aliphatic alcohols, based on the blown diolefin polymer drying oil.

9. The process according to claim 8 in which the air blown polymer oil is air blown polybutadiene.

10. The process according to claim 8 in which the air blown polymer oil is the air blown liquid copolymer of butadiene and styrene.

11. The process according to claim 8 in which the air blown resin is obtained by polymerizing a feed stock consisting of 60 to 64% of a stream-cracked petroleum fraction boiling between 38° and 46° C. and having the following composition:

| | Wt. Percent |
|---|---|
| Isoprene | 0.5 to 3.0 |
| Trans-pentene-2 | 3.0 to 5.0 |
| Cis-pentene-2 | 2.0 to 12.0 |
| 2-methyl butene-2 | 2.0 to 20.0 |
| Cyclopentadiene | 0 to 5.0 |
| Trans-piperylene | 20 to 55.0 |
| Cis-piperylene | 15 to 55.0 |
| Cyclopentene | 7 to 20.0 |
| Cyclopentane | 0 to 4.0 |
| Acetylenes | Trace |
| $C_6+$ | 0 to 2 | and 36 to 40% dicyclopentadiene, and air blowing the resulting resin.

12. The process according to claim 8 in which the ester is titanium tetra-isopropylate.

13. The process according to claim 11 in which the air blown polymer oil is air blown polybutadiene, and the ester is titanium tetra-isopropylate.

14. The process according to claim 11 in which the air blown polymer oil is an air blown liquid copolymer of butadiene and styrene, and the ester is titanium tetra-isopropylate.

References Cited in the file of this patent

UNITED STATES PATENTS

| 2,445,644 | Soday | July 20, 1948 |
| 2,875,919 | Henderson | Mar. 3, 1959 |
| 2,895,979 | Segraves et al. | July 21, 1959 |